United States Patent
Yu et al.

(10) Patent No.: US 6,662,346 B1
(45) Date of Patent: Dec. 9, 2003

(54) METHOD AND APPARATUS FOR REDUCING POWER DISSIPATION IN FINITE FIELD ARITHMETIC CIRCUITS

(75) Inventors: Zhan Yu, Sunnyvale, CA (US); Weishi Feng, San Jose, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 10/072,034

(22) Filed: Feb. 8, 2002

Related U.S. Application Data
(60) Provisional application No. 60/326,967, filed on Oct. 3, 2001.

(51) Int. Cl.[7] .............................................. G06F 17/05
(52) U.S. Cl. .................................. 716/2; 716/3; 716/4
(58) Field of Search ..................... 716/1, 2–4; 708/319; 714/769; 382/181

(56) References Cited

U.S. PATENT DOCUMENTS

| | | | |
|---|---|---|---|
| 5,602,753 A | * | 2/1997 | Fukui .............................. 716/4 |
| 6,286,022 B1 | | 9/2001 | Kaliski, Jr. et al. |

FOREIGN PATENT DOCUMENTS

| | | |
|---|---|---|
| WO | WO 91/20028 | 12/1991 |
| WO | WO 01/20427 A2 | 3/2001 |

OTHER PUBLICATIONS

Christof Paar "Some Remarks on Efficient Inversion in Finite Fields" Worcester Polytechnic Institute, ECE Department, Worcester, MA.

Anatha P. Chandrakasan and Robert W. Brodersen, "Minimizing Power Consumption in Digital CMOS circuits" Proceedings of the IEEE, vol. 83, No. 4, Apr. 1995.

A. G. Wassal, M. A. Hassan and M. I. Elmasry, "Low–Power Design of Finite Field Multipliers for Wireless Applications," Department of Electrical and Computer Engineering, University of Waterloo, Waterloo, ON.

Leilei Song and, Keshab K. Parhi "Optimum Primitive Ploynomials for Low–Area Low–Power Finite Field Semi–Systolic Multipliers" IEEE, 1997 pp. 375–384.

Chris J. Nicol and Patrick Larsson, "Low Multiplier Multiplication for FIR Filters" Bell Laboratories, Lucent Technologies, Holmdel, NJ.

Surendra K. Jain, Leilei Song, "Efficient Semisystoloc Architectures for Finite–Field Arithmetic," IEEE, 1998 pp. 101–113.

Leilei Song and Keshab K. Parhi, "Low–Energy Digit–Serial/Parallel Finite Field Multipliers," Journal of VLSI Signal Processing 19, 1998, Kluwer Academic Publishers: Netherlands, pp. 149–166.

\* cited by examiner

Primary Examiner—Vuthe Siek
Assistant Examiner—Naum Levin (57) ABSTRACT

A finite field arithmetic circuit with reduced power dissipation has first and second circuit inputs. A first circuit transition probability of the first circuit input is calculated by applying a random input to the first circuit input and a constant input to the second circuit input. A second circuit transition probability of the second circuit input is calculated by applying a constant input to the first circuit input and a random input to the second circuit input. One of the first and second circuit inputs having a lower circuit transition probability is selected. A first time-varying rate that a first input signal to the arithmetic circuit varies is compared with a second time-varying rate that a second input signal to the arithmetic circuit varies. The input signal having a higher time-varying rate is selected and coupled to the selected one of the first and second circuit inputs.

38 Claims, 8 Drawing Sheets

METHOD AND APPARATUS FOR REDUCING POWER DISSIPATION IN FINITE FIELD ARITHMETIC CIRCUITS

CROSS-REFERENCE TO RELATED APPLICATIONS

This application claims the benefit of U.S. Provisional Application No. 60/326,967, filed Oct. 3, 2001, which is hereby incorporated by reference.

FIELD OF THE INVENTION

The present invention relates to finite field arithmetic circuits, and more particularly to finite field multiplication and division circuits for error correction coding and decoding.

BACKGROUND OF THE INVENTION

Reed-Solomon error-correcting codes help reduce bit error rate (BER) in applications such as data storage, digital video broadcasts, and wireless communications. Reed-Solomon codes operate on finite fields ($GF(2^m)$). For high speed and low power, complex finite field arithmetic operations such as multiplication and division must be implemented efficiently.

Several different architectures that currently perform finite field arithmetic operations include standard, normal, and dual basis representations. For each representation, bit-parallel, bit-serial and digital architectures have been proposed for different application speed requirements. Most designs focus on reducing circuit area to improve speed.

Increased demand for portable DSP architectures has generated significant interest in the design of low power VLSI systems. For finite field arithmetic circuits, many approaches have been proposed for reducing power dissipation. For example, the impact of a primitive polynomial $p(x)$ on power dissipation has been studied. The use of an XOR-tree has also been studied as a low power approach for finite field multipliers.

SUMMARY OF THE INVENTION

A method and apparatus according to the invention reduces power dissipation of a finite field arithmetic circuit having first and second circuit inputs. A first circuit transition probability of the first circuit input is calculated by applying a random input to the first circuit input and a constant input to the second circuit input. A second circuit transition probability of the second circuit input is calculated by applying a constant input to the first circuit input and a random input to the second circuit input. The first circuit transition probability is compared with the second circuit transition probability. One of the first and second circuit inputs having a lower circuit transition probability is selected.

In other features, a first time-varying rate that a first input signal to the arithmetic circuit varies is compared with a second time-varying rate that a second input signal to the arithmetic circuit varies. One of the first and second input signals having a higher time-varying rate is selected.

In yet other features, the selected one of the first and second input signals is coupled to the selected one of the first and second circuit inputs.

In other features, the circuit transition probability of the first circuit input is determined by computing node transition probabilities of circuit nodes associated with the first circuit input. The circuit transition probability of the second circuit input is determined by computing node transition probabilities of circuit nodes associated with the second circuit input.

In other features, the arithmetic circuit is a finite field multiplier. The finite field multiplier is one of a semi-systolic multiplier and a Mastrovito multiplier.

In still other features, the arithmetic circuit is a finite field multiplier implemented in a finite field divider. The finite field divider is implemented as an inverter that is connected to the finite field multiplier. The finite field multiplier is one of a semi-systolic multiplier and a Mastrovito multiplier and the inverter is implemented directly in combinatorial logic.

In still other features, the arithmetic circuit is implemented in an error correcting coding circuit. The error correction coding circuit is a Reed-Solomon error correction coding circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In high-speed CMOS circuits, dynamic switching activities dominate the overall power dissipation characteristics of the circuit. Reducing switching activities is an effective method for reducing power dissipation. The present invention reduces power dissipation by identifying the impact of slow and fast time-varying inputs on the power dissipation of finite field arithmetic circuits. The present invention exploits the asymmetry of the slow and fast time-varying inputs to achieve significant power savings. For finite field $GF(2^m)$ with large m, the present invention provides a low power implementation of composite field multipliers and dividers. The reduced power dissipation provided by the present invention does not involve increased circuit delay or area overhead. The present invention can be used in conjunction with other approaches for further reducing power dissipation.

The finite field $GF(2^m)$ contains $2^m$ elements. $GF(2^m)$ is an extension of $GF(2)$, which has elements 0 and 1. Finite fields contain a zero element and a primitive element. The finite field is constructed as a vector space over $GF(2)$ with a primitive polynomial $p(x)=x^m+p_{m-1}x^{m-1}+ \ldots +p_1^x+p_0$ (where $p_{m-1}, \ldots, p_0 \in GF(2)$). The primitive element $\alpha$ is a root of the primitive polynomial $p(x)$. In other words, $$\alpha^m = p_{m-1}\alpha^{m-1} + \ldots + p_1\alpha + p_0.$$

The primitive element $\alpha$ can be used to generate all nonzero elements in the finite field $GF(2^m)$. A standard basis of $GF(2^m)$ over $GF(2)$ is a basis of the form $\{1, \alpha, \ldots, \alpha^{m-1}\}$. Any element $A$ of finite field $GF(2^m)$ can be represented by polynomials of degree m−1 as:

$$GF(2^m) = \{A | A = a_{m-1}\alpha^{m-1} + \ldots + a_1\alpha + a_0\}$$

where $a_{m-1}, \ldots, a_0 \in GF(2)$. A finite field multiplication under the standard basis can be performed by polynomial multiplication followed by a modulo operation:

$$C = AB \bmod p(x).$$

Various architectures have been proposed to implement a standard basis multiplication. A semi-systolic array multiplier is the most common architecture. A Mastrovito multiplier is designed for a dedicated primitive polynomial $p(x)$. A composite field multiplier has reduced circuit complexity. In re-configurable Reed-Solomon codecs, input signals of a finite field multiplier often have different switching probabilities. For example in a Reed-Solomon codec, a random data symbol is multiplied by a coefficient of the finite field. The coefficient is set equal to a constant once the re-configurable codec is programmed.

Figure 1:
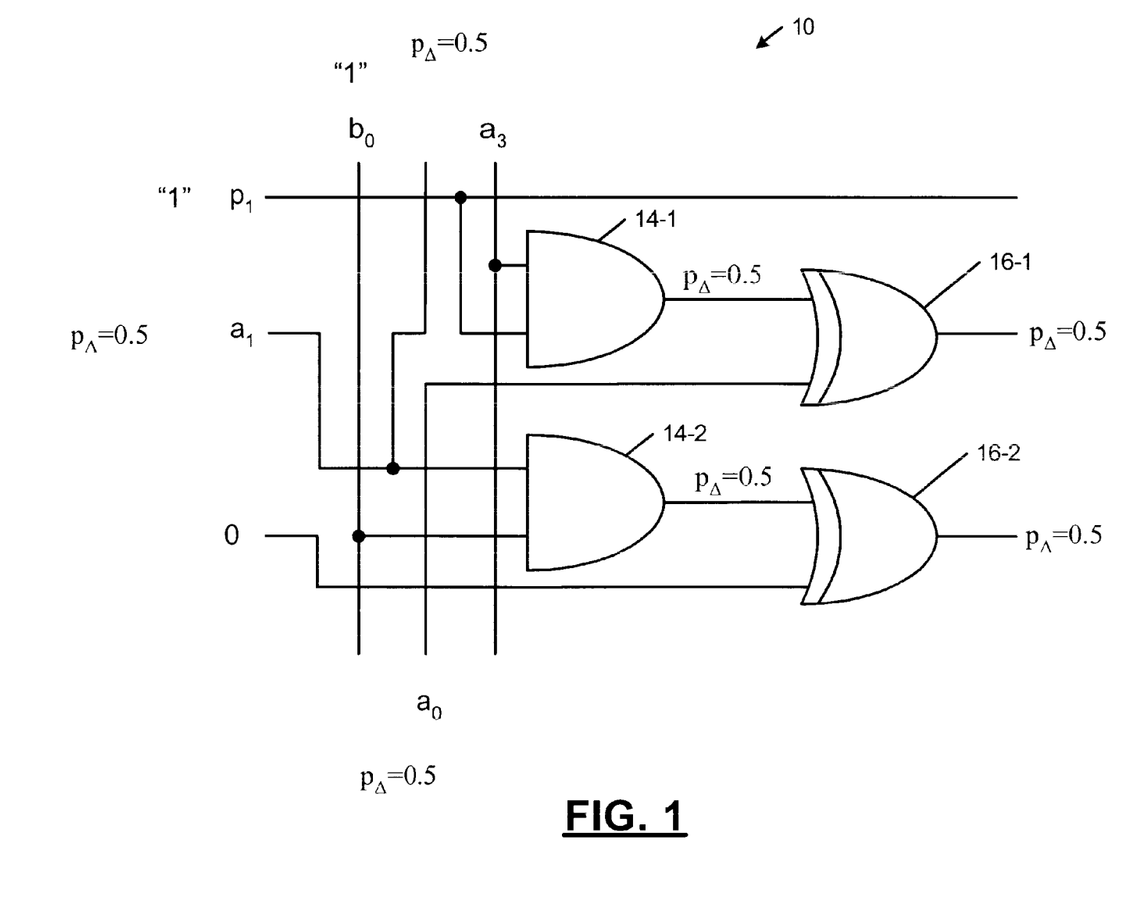
FIG. 1 is an electrical schematic of a basic cell of a least significant bit (LSB)-first finite field array multiplier with a random first input A and a constant second input B.
Figure 2:
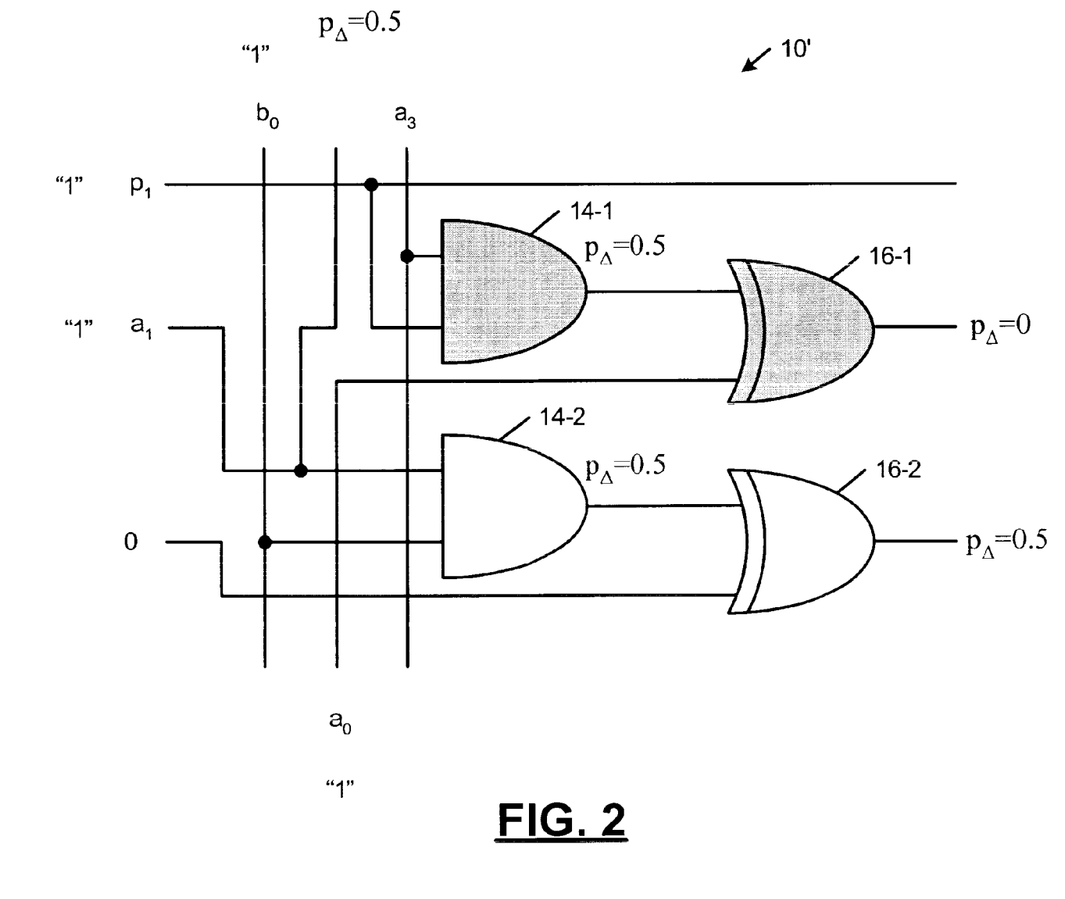
FIG. 2 is an electrical schematic of a basic cell of a LSB-first finite field array multiplier with a constant first input A and a random second input B.

Referring now to FIGS. 1 and 2, circuit switching probabilities in basic cells 10 and 10' of a least significant bit (LSB)-first semi-systolic array multiplier are illustrated. The LSB-first semi-systolic array multiplier has a regular structure and the computation of $$C = AB \bmod p(x)$$

is decomposed into m columns of basic cells ($1 \leq k \leq m$), where each column computes:

$$A^{(k)} = A^{(k-1)}\alpha \bmod p(x)$$

$$C^{(k)} = A^{(k-1)}b_{k-1} + C^{(k-1)}$$

with $W^{(0)}=0$ and $A^{(0)}=A$. Finally, the product is $$C^{(m)} = c_{m-1}^{(m)}\alpha^{m-1} + \ldots + c_1^{(m)}\alpha + c_0^{(m)}.$$

The basic cell 10 includes AND-gates 14-1 and 14-2 and XOR-gates 16-1 and 16-2. To analyze the transition probability in the basic cell 10, random data is applied to a first input A and a string of zeros or ones are applied to a second input B. A transition probability $p_A$ of each circuit node is computed. The transition probability of all circuits nodes are at maximum value $p_A=0.5$. In FIG. 2, half of a basic cell 10', including the shaded AND-gate 14-1 and the shaded XOR-gate 16-1, is not switching at all. Therefore, the power dissipation in the basic cell 10' of the LSB-first semi-systolic array multiplier is not symmetric with respect to the transition probabilities of the first and second multiplier inputs A and B.

Figure 3:
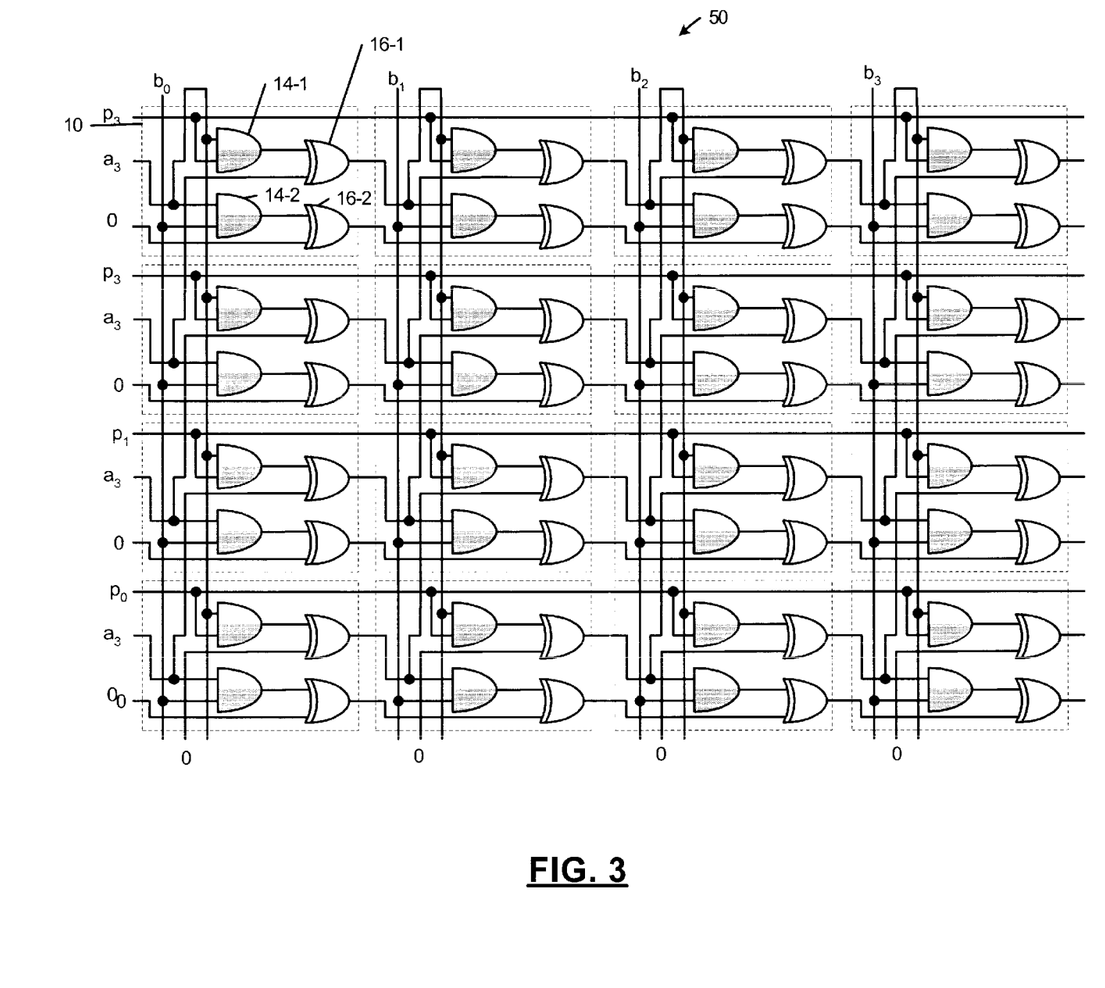
FIG. 3 is an electrical schematic of a 4×4 finite field multiplier with a random first input A and a constant second input B.
Figure 4:
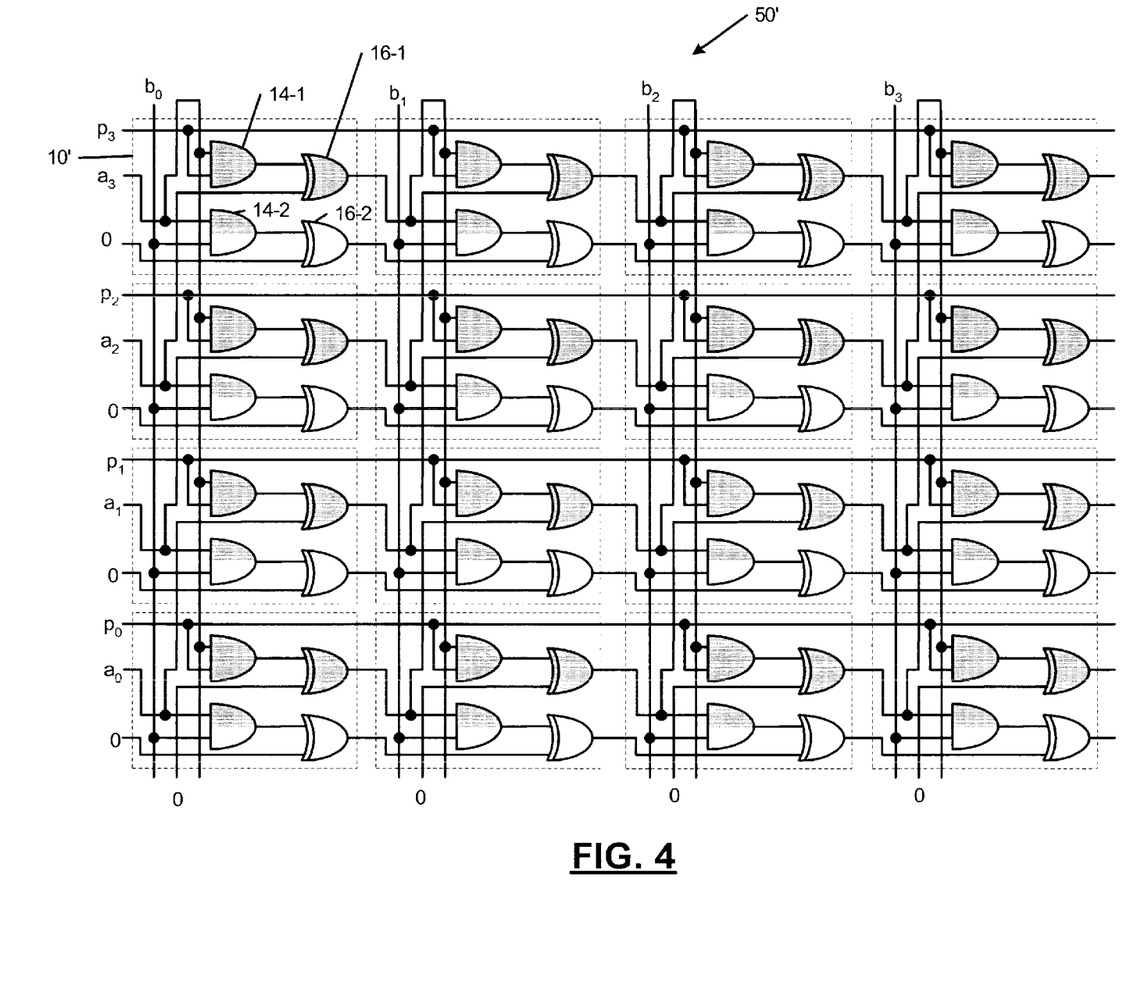
FIG. 4 is an electrical schematic of a 4×4 finite field multiplier with a constant first input A and a random second input B.

Referring now to FIG. 3, a 4×4 LSB-first semi-systolic array multiplier 50 illustrates transition probabilities with a random first input A and a constant second input B. FIG. 4 shows a 4×4 LSB-first semi-systolic array multiplier 50' with a constant first input A and a random second input B. A gate 14 or 16 that is fully shaded has constant inputs. Therefore, the fully shaded gates dissipate no dynamic switching power. A gate 14 or 16 that is half-shaded has one constant input. The half-shaded gates dissipate less power than gates having both inputs that are actively switching.

FIGS. 3 and 4 show signal transitions of inputs A and B propagating through the multiplier 50. The configuration in FIG. 4 has lower switching activity and therefore lower power dissipation. The power dissipation in the LSB-first semi-systolic array multiplier is asymmetric with respect to the transition probabilities of first and second multiplier inputs A and B. Therefore, a slow varying input is assigned to the A-input of the multiplier for reduced power dissipation.

A Mastrovito multiplier is designed for a dedicated primitive polynomial $p(x)$. The multiplication $$C = AB \bmod p(x)$$

is described as matrix multiplication $$C = \underline{A}B$$

Where matrix $\underline{A}$ is given by A and $p(x)$. For $GF(2^4)$ with $p(x)=x^4+x+1$, $$C = \underline{A}B = \begin{bmatrix} a_o & a_3 & a_2 & a_1 \\ a_1 & a_o+a_3 & a_2+a_3 & a_o+a_2 \\ a_2 & a_1 & a_o+a_3 & a_2+a_3 \\ a_3 & a_2 & a_1 & a_o+a_3 \end{bmatrix} \begin{bmatrix} b_o \\ b_1 \\ b_2 \\ b_3 \end{bmatrix}$$

To compute C, the matrix $\underline{A}$ is evaluated and a multiplication $\underline{A}B$ is computed. The multiplication step can be implemented with AND-gates followed by an XOR-tree. The evaluation of matrix $\underline{A}$ only occurs when A switches. The multiplication occurs at every input sample. If the two input signals have different switching probabilities, a slow varying input is assigned to the A-input of the multiplier for reduced power dissipation.

Figure 5:
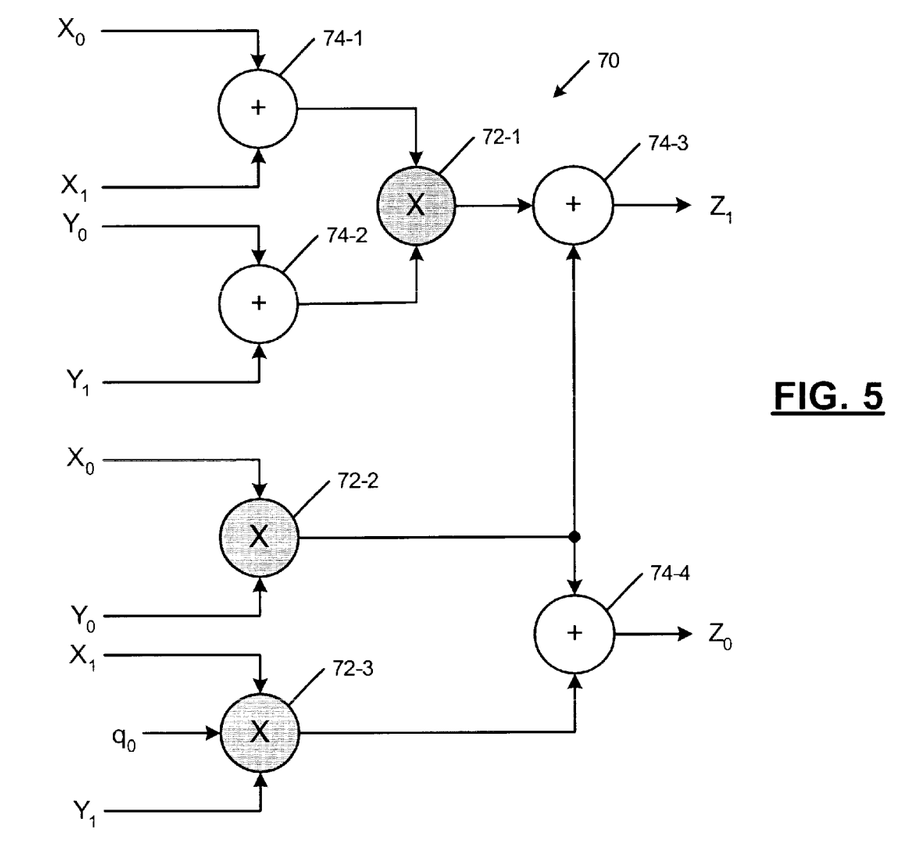
FIG. 5 is a composite field multiplier.

Referring now to FIG. 5, a composite field multiplier often decomposes a $GF(2^m)$ multiplier into multipliers in small finite fields. For example, a $GF(2^m)$ multiplier 70 is implemented with multipliers 72-1, 72-2, and 72-3 and adders 74-1, 74-2, 74-3, and 74-4 as shown in FIG. 5. For the composite field multiplier 70, the multiplier 72-1 will be analyzed first. If $Y=\{Y_1, Y_0\} \in GF(2^m)$ is a slow varying signal, $Y_1+Y_0$ is slow varying. Therefore, $Y_{1+Y0}$ is assigned to the A-input of multiplier 72-1 for low power dissipation. Similarly, the same guidelines are used to configure the inputs of the remaining multipliers 72-2 and 72-3 in FIG. 5.

Finite field dividers also find application in Reed-Solomon codecs. For example, in Berlekamp-Massey and Euclidean algorithms, $\Lambda(x)/\Delta$ is computed, where $\Lambda(x) = \Lambda_t x^t + \Lambda_{t-1} x^{t-1} + \ldots + \Lambda_0$ is a polynomial on the finite field $GF(2^m)$ and $\Delta \in GF(2^m)$. In a circuit implementation, the divider is often shared and computes several polynomial coefficient divisions. For example, $\Delta$ is a fixed input of the divider while the dividend is changing from $\Lambda_t$ to $\Lambda$. The two divider inputs also have different switching probabilities.

Figure 6:
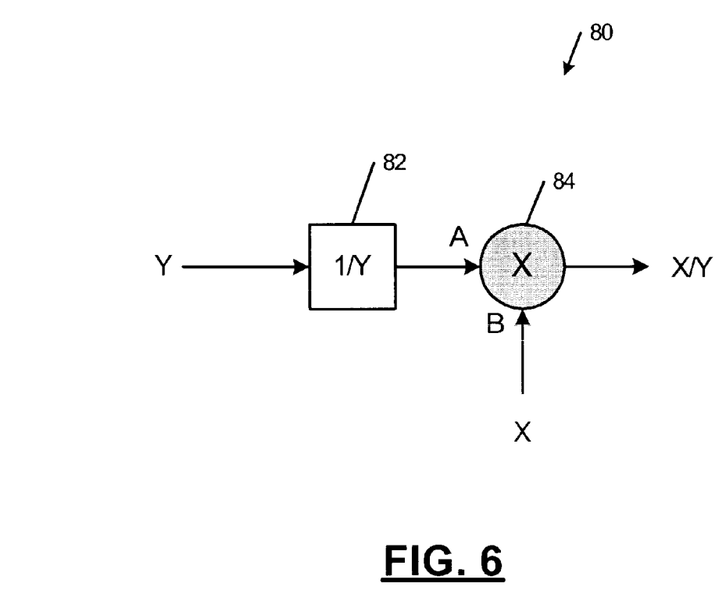
FIG. 6 is a first implementation of a finite field divider.

Referring now to FIG. 6, a finite field divider 80 can be implemented using a finite field inverter 82 followed by a finite field multiplier 84. For a finite field $GF(2^m)$ with a small value for m, the inverter 82 is preferably implemented directly with combinatorial logic. The output of the inverter 82 is connected to the A-input of the multiplier 84. In the divider 80' of FIG. 7, however, the output of the inverter 82 is connected to the B-input of the multiplier 84.

Figure 7:
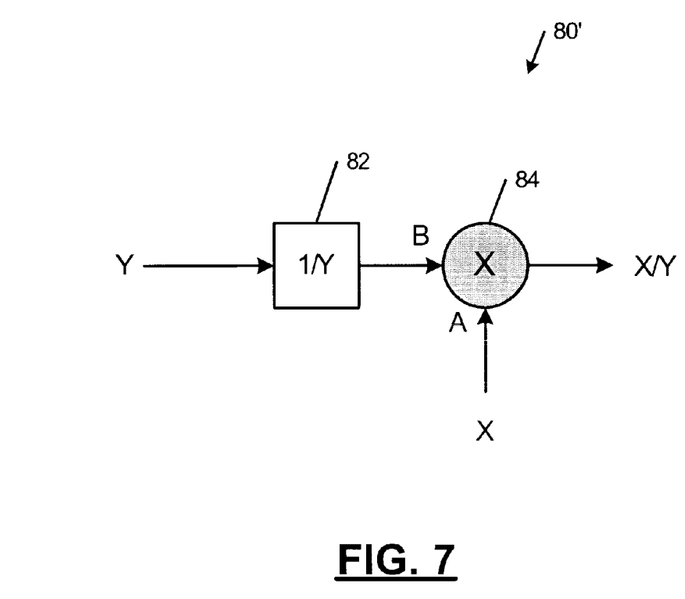
FIG. 7 is a second implementation of a finite field divider.

The implementation in FIG. 6 has lower power dissipation when the divisor Y is a slow varying signal. In some Reed-Solomon codec applications, the divisor Y is a slow varying signal. FIGS. 6 and 7 may have different circuit delays depending on the implementation of the multiplier. For example, if a Mastrovito multiplier is used, the implementation in FIG. 6 has a longer circuit delay. The A-input of a Mastrovito multiplier has a longer delay path to the output of the multiplier.

Figure 8:
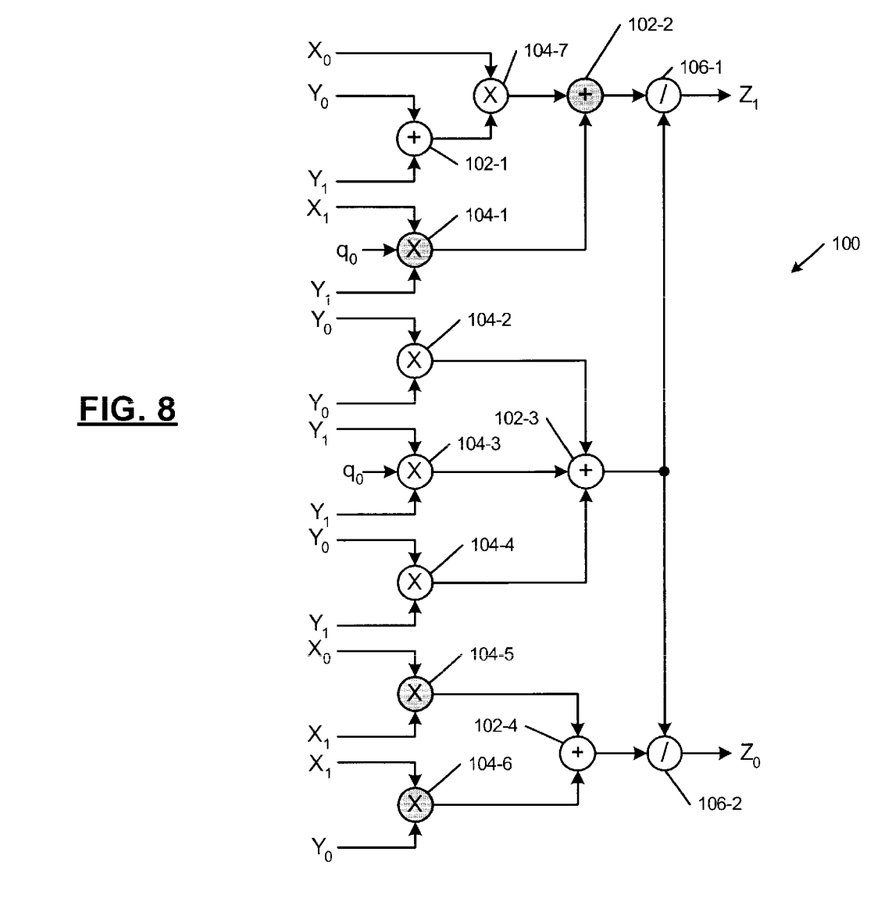
FIG. 8 is a composite field divider.

Referring now to FIG. 8, a composite field divider architecture is often used as an efficient divider implementation when the value of m is large. FIG. 8 shows a composite field divider 100 for computing X/Y for $GF(2^m)$. The divider is built with adders 102-1, 102-2, 102-3 and 102-4, multipliers 104-1, 104-2, . . . , and 104-7, and dividers 106-1 and 106-2. If the dividend X is random and the divisor Y is slow varying, the shaded multipliers 104-1, 104-5 and 104-6 have inputs with different switching probabilities. The shaded multipliers 104-1, 104-5 and 104-6 are configured as discussed above in FIG. 2 or as the Mastrovito multiplier described above for low power dissipation. For the two $GF(2^{m/2})$ dividers in FIG. 8, the divisor is a function of Y, which is slow varying. The low power division method discussed above is applied. However, extra delay may be introduced.

As can be appreciated from the foregoing, the present invention reduces power dissipation of finite field arithmetic circuits. Several finite field multipliers and dividers were implemented to identify potential power reduction. For finite field multipliers, one input is set as a random signal and the other is a slow varying random signal. For the finite field divider, the divisor is a slow varying random signal, as in some Reed-Solomon codec applications. The results are set forth in Table 1 below:

TABLE 1

| Design | Traditional | Proposed | Saving % |
| --- | --- | --- | --- |
| GF ($2^4$) Mastrovito Multiplier | 22.8 μW | 18.6 μW | 18.4 |
| GF ($2^8$) Mastrovito Multiplier | 148 μW | 88.8 μW | 40.0 |
| GF ($2^8$) Composite Field Multiplier | 89.6 μW | 77.8 μW | 13.2 |
| GF ($2^8$) Composite Field Divider | 181 μW | 153 μW | 15.0 |

Figure 9:
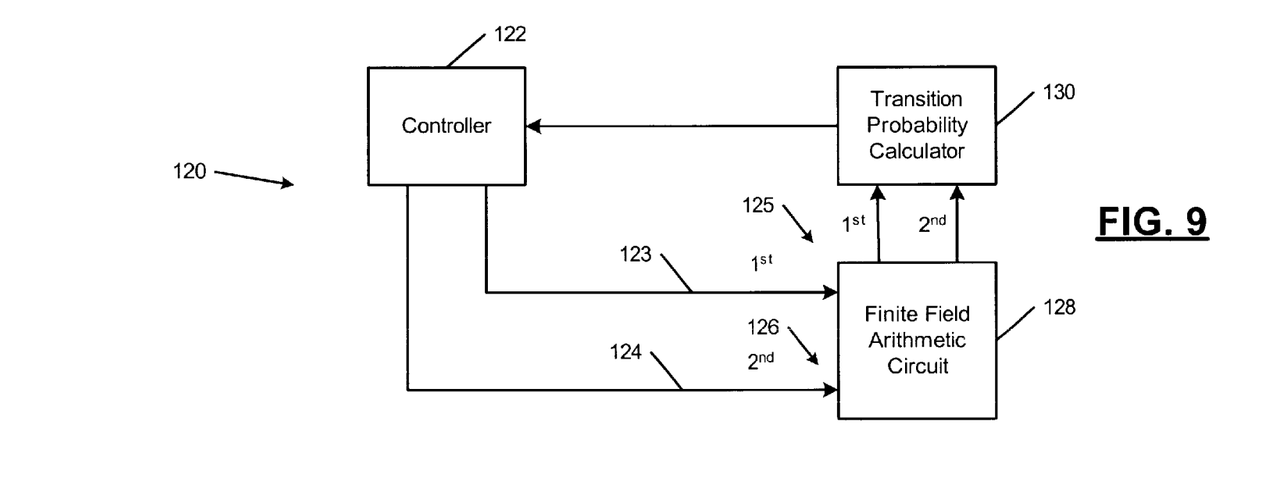
FIG. 9 is a transition probability calculating circuit.

Referring now to FIG. 9, a transition probability determining circuit 120 is shown. The transition probability determining circuit 120 includes a controller 122 that generates first and second input signals 123 and 124 that are input to first and second circuit inputs 125 and 126 of a finite field arithmetic circuit 128. In a first mode, the first input signal 123 is random and the second input signal 124 is constant (e.g. ones or zeros). A transition probability calculator 130 monitors transition probabilities of the first and second circuit inputs 125 and 126 during the first mode. In a second mode, the first input signal 123 is constant and the second input signal 124 is random. A transition probability calculator 130 monitors transition probabilities of the first and second circuit inputs during the second mode. The transition probabilities of the first and second circuit inputs 125 and 126 during the first and second modes are used to select the input for a fast time-varying input signal and the input for a slow time-varying input signal as described above. As can be appreciated, the transition probability determining circuit 120 can be implemented in a software simulator.

Figure 10A:
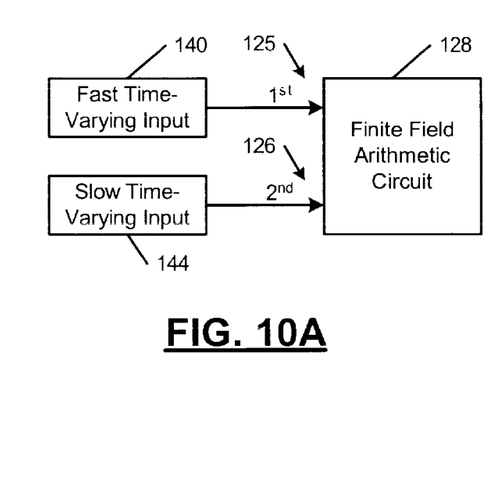
FIGS. 10A and 10B illustrate fast and slow time-varying inputs connected to a finite field arithmetic circuit.
Figure 10B:
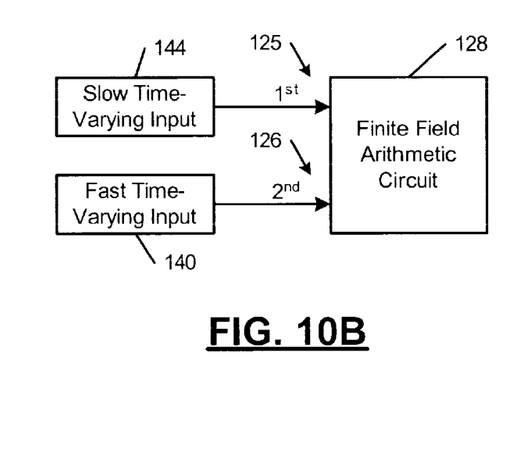

Referring now to FIGS. 10A and 10B, based upon the results calculated in FIG. 9, a fast time-varying input 140 is coupled to one of the first and second circuit inputs 125 and 126 having a lower circuit transition probability. A slow time-varying input is coupled to the other of the first and second circuit inputs 124 and 126 having a higher circuit transition probability. As a result, the power dissipation of the finite field arithmetic circuit is reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for reducing power dissipation of a finite field arithmetic circuit having first and second circuit inputs, comprising:

calculating a first circuit transition probability of said first circuit input by applying a random input to said first circuit input and a constant input to said second circuit input;

calculating a second circuit transition probability of said second circuit input by applying a constant input to said first circuit input and a random input to said second circuit input;

comparing said first circuit transition probability to said second circuit transition probability;

selecting one of said first and second circuit inputs having a lower circuit transition probability;

comparing a first time-varying rate that a first input signal to said arithmetic circuit varies with a second time-varying rate that a second input signal to said arithmetic circuit varies; and selecting one of said first and second input signals having a higher time-varying rate.

2. The method of claim 1 further comprising coupling said selected one of said first and second input signals to said selected one of said first and second circuit inputs.

3. The method of claim 2 further comprising coupling the other of said first and second input signals to the other of said first and second circuit inputs.

4. The method of claim 2 wherein said arithmetic circuit is a finite field multiplier.

5. The method of claim 4 wherein said finite field multiplier is one of a semi-systolic multiplier and a Mastrovito multiplier.

6. The method of claim 2 wherein said arithmetic circuit is a finite field multiplier implemented in a finite field divider.

7. The method of claim 6 wherein said finite field divider is implemented as an inverter that is connected to said finite field multiplier.

8. The method of claim 7 wherein said finite field multiplier is one of a semi-systolic multiplier and a Mastrovito multiplier and wherein said inverter is implemented directly in combinatorial logic.

9. The method of claim 2 wherein said arithmetic circuit is a finite field multiplier implemented in a composite field multiplier.

10. The method of claim 2 wherein said arithmetic circuit is a finite field multiplier implemented in a composite field divider.

11. The method of claim 2 wherein said arithmetic circuit is implemented in an error correcting coding circuit.

12. The method of claim 11 wherein said error correction coding circuit is a Reed-Solomon error correction coding circuit.

13. The method of claim 1 wherein said circuit transition probability of said first circuit input is determined by computing node transition probabilities of circuit nodes associated with said first circuit input.

14. The method of claim 1 wherein said circuit transition probability of said second circuit input is determined by computing node transition probabilities of circuit nodes associated with said second circuit input.

15. A finite field arithmetic circuit comprising:
a first circuit input having a first circuit transition probability;
a second circuit input having a second circuit transition probability, wherein said second circuit transition probability is lower that said first circuit transition probability;
a first input that generates a first input signal to said first circuit input of said finite field arithmetic circuit that has a first time-varying rate; and
a second input that generates a second input signal to said second circuit input of said finite field arithmetic circuit, wherein said second input signal has a second time-varying rate that is higher than said first time-varying rate.

16. The finite field arithmetic circuit of claim 15 wherein said arithmetic circuit is a finite field multiplier.

17. The finite field arithmetic circuit of claim 16 wherein said finite field multiplier is one of a semi-systolic multiplier and a Mastrovito multiplier.

18. The finite field arithmetic circuit of claim 15 wherein said arithmetic circuit is a finite field multiplier implemented in a finite field divider.

19. The finite field arithmetic circuit of claim 18 wherein said finite field divider is implemented as an inverter that is connected to said finite field multiplier.

20. The finite field arithmetic circuit of claim 19 wherein said finite field multiplier is one of a semi-systolic multiplier and a Mastrovito multiplier and wherein said inverter is implemented directly in combinatorial logic.

21. The finite field arithmetic circuit of claim 15 wherein said arithmetic circuit is a finite field multiplier implemented in a composite field multiplier.

22. The finite field arithmetic circuit of claim 15 wherein said arithmetic circuit is a finite field multiplier implemented in a composite field divider.

23. The finite field arithmetic circuit of claim 15 wherein said arithmetic circuit is implemented in an error correcting coding circuit.

24. The finite field arithmetic circuit of claim 23 wherein said error correction coding circuit is a Reed-Solomon error correction coding circuit.

25. A method for reducing power dissipation of a finite field arithmetic circuit having first and second circuit inputs, comprising:

calculating a first circuit transition probability of said first circuit input by applying a random input to said first circuit input and a constant input to said second circuit input;
calculating a second circuit transition probability of said second circuit input by applying a constant input to said first circuit input and a random input to said second circuit input;
comparing said first circuit transition probability to said second circuit transition probability;
selecting one of said first and second circuit inputs having a higher circuit transition probability;
comparing a first time-varying rate that a first input signal to said arithmetic circuit varies with a second time-varying rate that a second input signal to said arithmetic circuit varies; and
selecting one of said first and second input signals having a lower time-varying rate.

26. The method of claim 25 further comprising the step of coupling said selected one of said first and second input signals to said selected one of said first and second circuit inputs.

27. The method of claim 26 further comprising coupling the other of said first and second input signals to the other of said first and second circuit inputs.

28. The method of claim 26 wherein said arithmetic circuit is a finite field multiplier.

29. The method of claim 28 wherein said finite field multiplier is one of a semi-systolic multiplier and a Mastrovito multiplier.

30. The method of claim 26 wherein said arithmetic circuit is a finite field multiplier implemented in a finite field divider.

31. The method of claim 30 wherein said finite field divider is implemented as an inverter that is connected to said finite field multiplier.

32. The method of claim 31 wherein said finite field multiplier is one of a semi-systolic multiplier and a Mastrovito multiplier and wherein said inverter is implemented directly in combinatorial logic.

33. The method of claim 26 wherein said arithmetic circuit is a finite field multiplier implemented in a composite field multiplier.

34. The method of claim 26 wherein said arithmetic circuit is a finite field multiplier implemented in a composite field divider.

35. The method of claim 26 wherein said arithmetic circuit is implemented in an error correcting coding circuit.

36. The method of claim 35 wherein said error correction coding circuit is a Reed-Solomon error correction coding circuit.

37. The method of claim 25 wherein said circuit transition probability of said first circuit input is determined by computing node transition probabilities of circuit nodes associated with said first circuit input.

38. The method of claim 25 wherein said circuit transition probability of said second circuit input is determined by computing node transition probabilities of circuit nodes associated with said second circuit input.

* * * * *